United States Patent [19]
Hayes

[11] 3,881,786
[45] May 6, 1975

[54] INERTIA RESPONSIVE PROPORTIONING VALVE

[75] Inventors: William Stelzer, Milford; Edward J. Hayes, Ann Arbor, both of Mich.

[73] Assignees: Kelsey-Hayes Company, Romulus, Mich.

[22] Filed: July 23, 1973

[21] Appl. No.: 381,598

Related U.S. Application Data

[63] Continuation of Ser. No. 124,214, March 15, 1971, abandoned.

[52] U.S. Cl. ............ 303/24 F; 188/151 A; 188/349; 303/6 C
[51] Int. Cl. ........................... B60t 11/34; B60t 8/18
[58] Field of Search ................. 303/22, 24, 21, 6 C; 188/349, 151 A, 181 A, 195

[56] References Cited
UNITED STATES PATENTS

| | | | |
|---|---|---|---|
| 3,317,251 | 5/1967 | Hambling et al. | 303/6 C |
| 3,377,108 | 4/1968 | Eddy | 303/6 C |
| 3,455,609 | 7/1969 | Bratten | 303/6 C |
| 3,476,443 | 11/1969 | Bratten et al. | 303/6 C |
| 3,542,167 | 11/1970 | Wilson | 303/21 R |
| 3,588,188 | 6/1971 | Shattock | 303/21 CG |

*Primary Examiner*—Trygve M. Blix
*Assistant Examiner*—D. C. Butler
*Attorney, Agent, or Firm*—Harness, Dickey & Pierce

[57] ABSTRACT

A proportioning valve for the brake system of wheeled vehicle, which valve is operable at a preselected pressure to provide proportioning between inlet and outlet brake pressures at a selected ratio (other than 1:1) with the valve being responsive to a function of vehicle deceleration and to a function of brake pressure for varying the preselected pressure at which proportioning at the selected rate begins.

14 Claims, 4 Drawing Figures

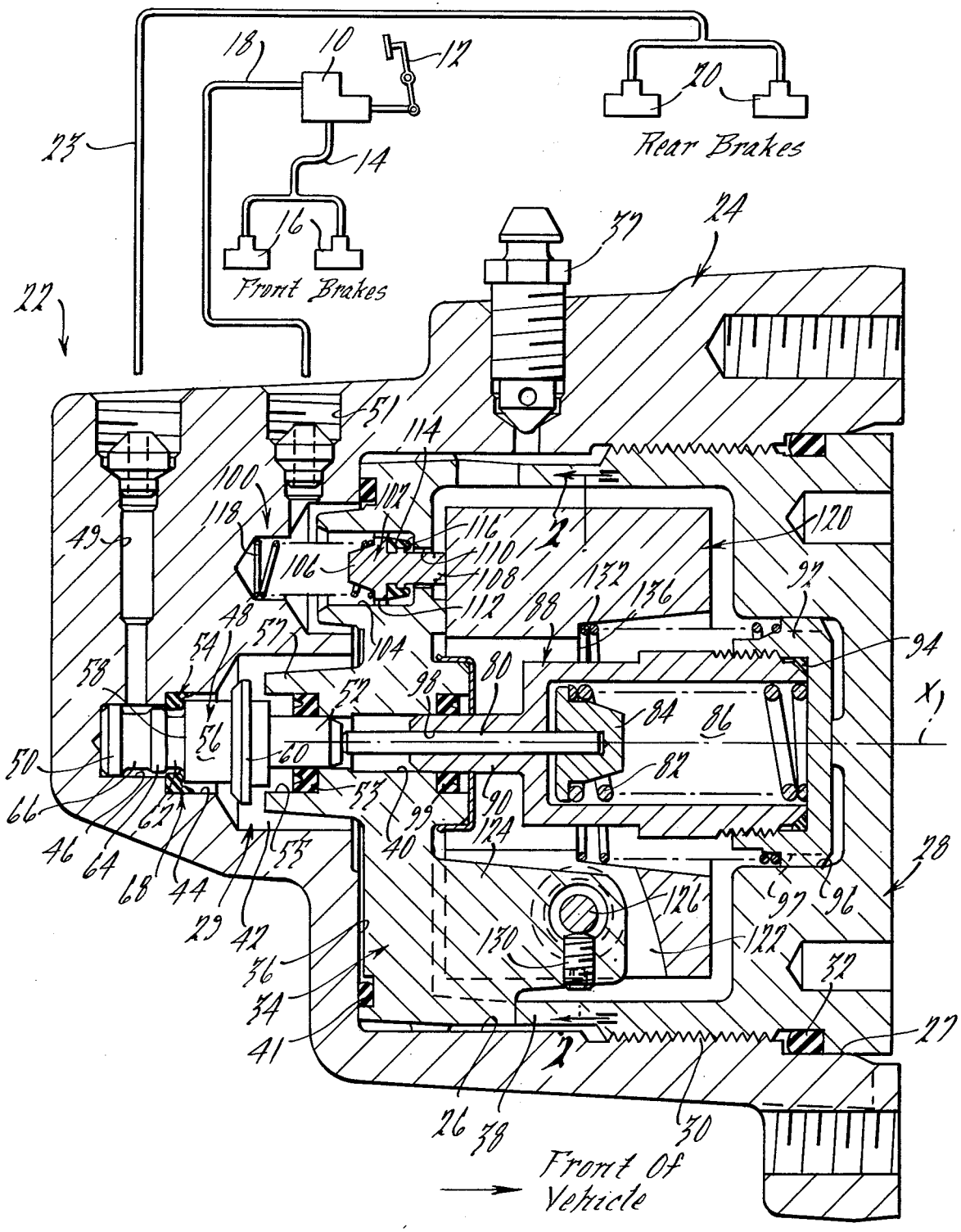

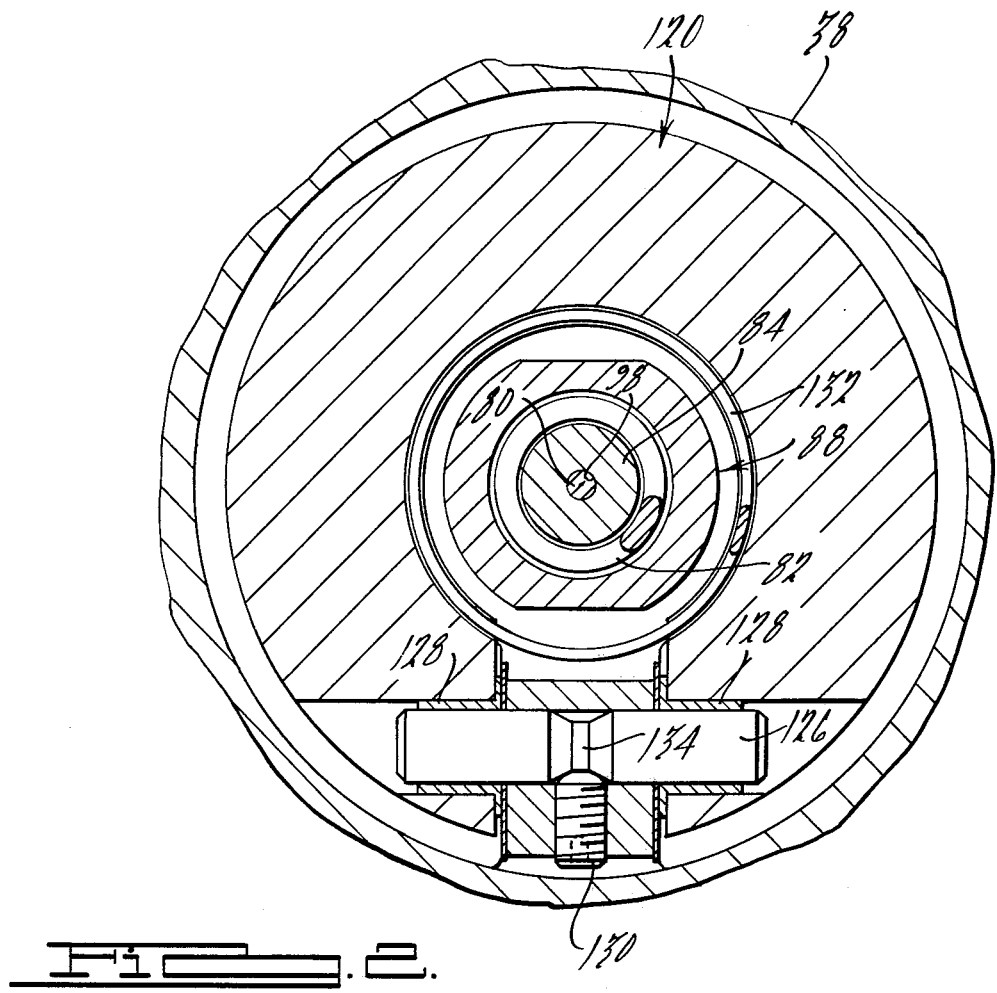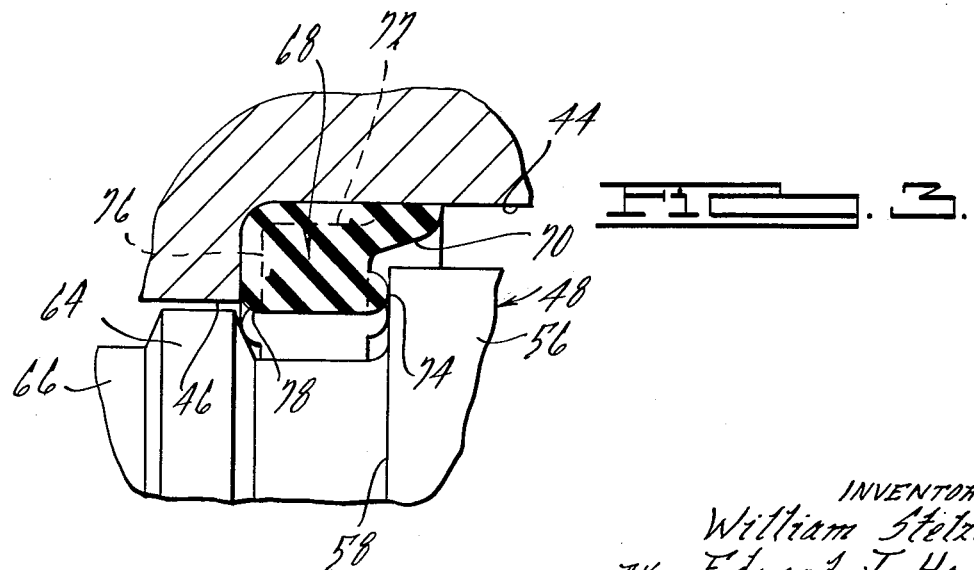

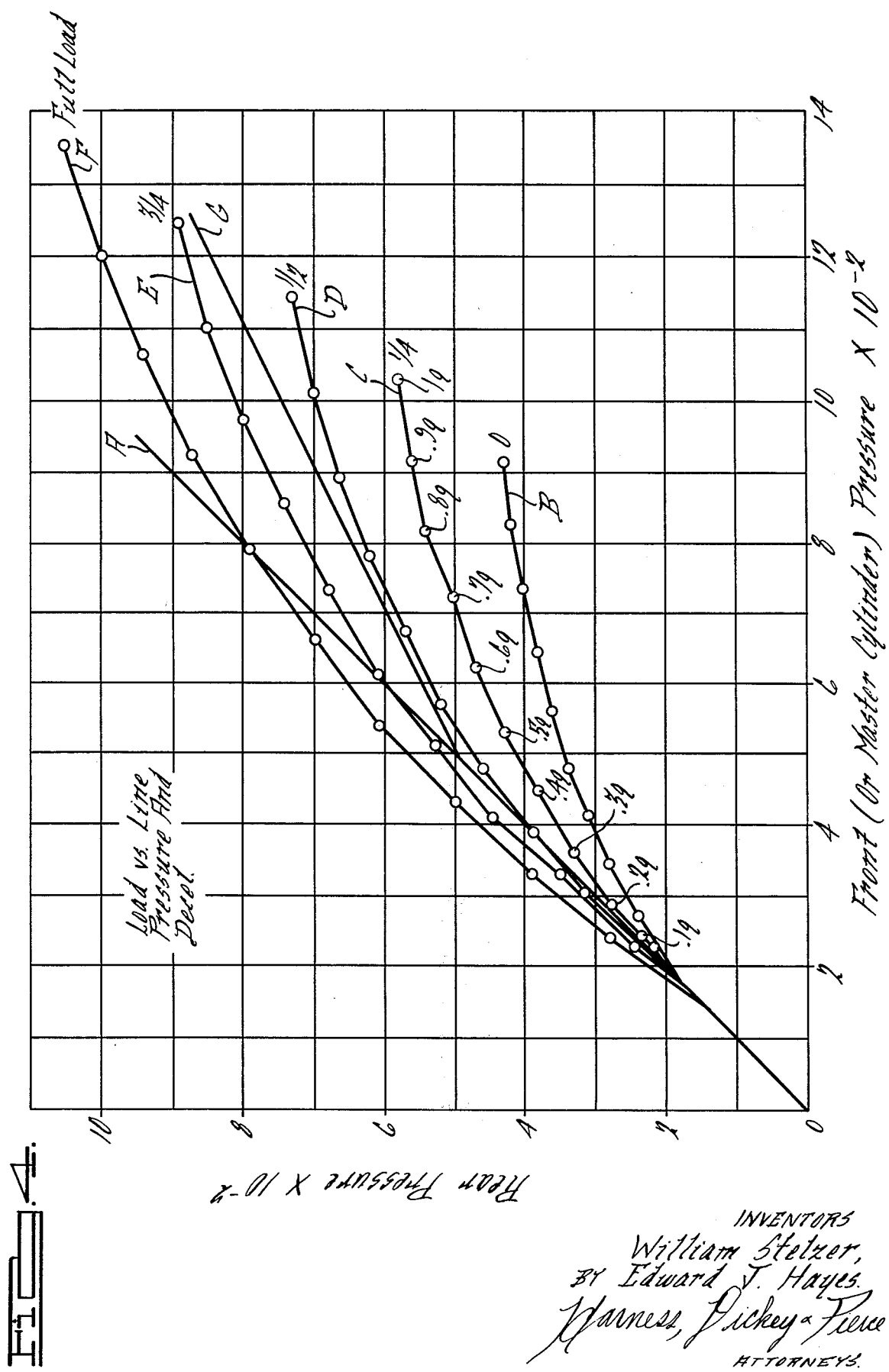

INERTIA RESPONSIVE PROPORTIONING VALVE

SUMMARY BACKGROUND OF THE INVENTION

This is a continuation of application Ser. No. 124,214, filed Mar. 15, 1971, now abandoned.

The present invention relates to proportioning valves.

In conventional proportioning valves, the effect of weight transferred from the rear wheels is compensated such, that upon the attainment of a selected level of input pressure from the master cylinder, further pressure increases to the rear brakes occur at a preselected ratio whereby the brake pressure is less than master cylinder pressure. This operates to deter premature lock-up of the rear wheels during braking as weight is transferred from the rear wheels to the front wheels. An idealized curve depicting the relationship between pressure to the front brakes (or from the master cylinder) and pressure to the rear brakes can be constructed with the curve indicating the desired compensation for weight transfer. Under some conditions, there can be a substantial deviation between the idealized relationship and actual performance. For example, conventional proportioning valves operate to initiate proportioning generally in response to a preselected magnitude of input pressure valves of this type would not reflect the loading of the vehicle which effects the weight transfer relative to the input brake pressure. In the present invention, the proportioning valve provides compensation for variations in vehicle loading.

There have been prior proportioning valve designs which are responsive to vehicle loading via a connection which senses suspension loading. The valve of the present invention while compensating for vehicle loading is constructed in a manner such that no auxiliary connections, as to the suspensions, are required.

Therefore, it is an object of the present invention to provide a proportioning valve which compensates for variations in vehicle loading.

It is another object of the present invention to provide a proportioning valve which compensates for variations in load and is of a simple construction requiring no auxiliary connections to the vehicle suspension. It is another general object of the present invention to provide a novel proportioning valve.

Other objects, features and advantages of the present invention will become apparent from the subsequent description and the appended claims, taken in conjunction with the accompanying drawings, in which:

FIG. 1 is a partial schematic diagram with the proportioning valve of the present invention shown partially in section and exemplifying features of the present invention;

FIG. 2 is a sectional view of the proportioning valve of FIG. 1 taken generally along the lines 2—2 in FIG. 1;

FIG. 3 is a view to increased scale of that part of the proportioning valve enclosed in the dot-dash lines numbered 3; and FIG. 4 are curves depicting the idealized relationship, for one vehicle, between fluid pressure to the rear brakes and fluid pressure to the front brakes (or from the master cylinder).

Looking to the drawings, the brake system for an automotive vehicle includes a conventional dual, master cylinder 10 which is actuable by means of a brake pedal 12. A first fluid line 14 communicates one chamber of master cylinder 10 to the front wheels brakes 16 and a second fluid line 18 communicates the other chamber of master cylinder 10 to the rear brakes 20 via a proportioning valve 22 and outlet line 23.

The proportioning valve 22 includes a cylinder member 24 which has an enlarged circularly sectioned cavity 26 and a reduced diameter, stepped cavity 29. The cavity 26 is open at one end 27 and is closed there by a cap 28 which is threadably engaged to cylinder member 24 via connecting threads 30. An annular seal 32 provides a fluid tight seal between the cap 28 and the open end 27 of the cavity 26.

A generally circular support plate 34 is located against an inner cylinder wall 36 (opposite the opening 27) by engagement with an inwardly extending end 38 of the cap 28. The plate 34 separates the large cavity 26 from small cavity 29 and has a centrally located through bore 40 which extends between the cavity 26 and the cavity 29 while an annular seal 41 seals the forward surface of the plate 34 with the inner cylinder wall 36, whereby the two cavities 26 and 29 are separated. A bleeder valve 37 is connected to cavity 29 to permit bleeding of the valve 22.

The small cavity 29 comprises bores 42, 44 and 46 which are stepped in consecutively reduced diameters and in which is located a proportioning valve assembly 54. The cylinder member 24 has a transverse bore 49 which communicates bore 46 to rear brake cylinders 20 via line 23; the member 24 has another transverse bore 51 which communicates bores 42 and 44 with master cylinder 10 via line 18. Thus bores 42, 44 define an inlet chamber and bore 46 defines an outlet chamber. The proportioning valve assembly 54 functions, in a manner to be described, to proportion the fluid flow between bores 44 and 46 and hence to proportion the fluid pressure to the rear brake cylinders 20. The assembly 54 includes a plunger 48 which has a head portion 50 slidably supported in stepped bore portion 46 and which has a stem portion 52 slidably supported in through bore 40. An annular seal 53, located in a counter bore portion 55 of bore 40 formed at the outer end of a nose portion 57 extending from the main body of the plate 34, engages the stem portion 52 to seal the bore 40 therewith. The plunger 48 has a large diameter portion 56 having an enlarged flange 60 intermediate its ends with the portion 56 being generally located in bores 42 and 44; the flange 60 is of a size to engage the nose portion 57 of plate 34 for a purpose to be seen. The plunger 48 has a reduced diameter portion 62 interposed between a shoulder 58 (defined by portion 56) and a valve head 64. The valve head 64 is located in clearance relationship in bore 46 and is connected to head portion 50 via a reduced diameter portion 66.

The valve assembly 54 also includes an elastomeric annular valve member 68 which surrounds the portion 62 and is engageable with a shoulder 52 defined by the juncture between bores 44 and 46. The valve member 68 and valve head 64 are operative together, in a manner to be seen, to control the fluid flow and pressure between bores 46 and 44. The structure of valve head 64 and valve member 68 is similar to that shown and described in the U.S. Pat. No. 3,423,936 to W. Stelzer, issued Jan. 28, 1969. Briefly, the valve member 68 has a lip 70 which normally is inclined radially outwardly to engage the side wall of bore 44 and acts to prevent flow thereby from bore 44 to bore 46. However, the shoulder 58 is engageable with a plurality of bosses 74 and in this condition free communication exists between bores 44 and 46 via the passage between valve member 68 and valve head 64.

The outer periphery of valve member 68 above lip 70 has a plurality of circumferentially spaced, axially extending grooves 72. The end of the valve element 68 has a plurality of angularly spaced grooves 76 defining a path with the shoulder 52 and located to communicate with grooves 72 to provide a path for flow of fluid from bore 46 to bore 44 past the lip 70 such that when the fluid pressure in bore 46 is higher than that in bore 44, the pressure difference can deflect lip 70 radially inwardly to permit the reverse flow of fluid from bore 46 to bore 44.

The plunger 48 is normally located (as shown in FIG. 1) with the shoulder 58 engaging the bosses 74 whereby the flow of fluid from master cylinder 10 to rear brake cylinder 20 (via bores 44 and 46) is unimpeded. The valve member 68 has a rounded valve seat 78 which is engageable with the radially outer surface of valve head 64 whereby flow can be blocked when the plunger 48 moves to its closed position. A pin 80 engages the stem 52 of plunger 48 and normally holds plunger 48 in its open position, i.e. valve head 64 out of engagement with valve seat 78, see FIG. 1, with a force set by the precompression of a spring 82 acting on pin 88 via a cap 84.

The proportioning valve assembly 54 generally operates in a known manner (see Stelzer patent supra). Thus, initially the plunger 48 is held in its open position by the force ($F1$) of the bias from spring 82. As pressure ($P1$) from master cylinder 10 is applied to the bores 44 and 46 the plunger 48 is urged to a position in which the valve head 64 will close against the valve seat 78, however, plunger 48 will not attain this position until the bias ($F1$) of the spring 82 has been overcome. The magnitude of the inlet pressure at bores 44 and 46 from master cylinder 10 at which closure occures is preselected for the desired braking effect. Thus, closure will occur when $P1A > F$, where $A$ is the cross-sectional area of stem 52. After the valve head 64 closes against the valve member 68, as the inlet pressure is increased, the pressure in bore 46 will exceed that in bore 44 and plunger 48 will be urged to its open position. The pressure in bore 44 will act on plunger 48 on an effective area ($B-A$) where $B$ is the area defined by the mean sealing diameter of valve head 64. The resultant force on plunger 48 (from the pressure in bore 44) assists the spring 82 to move the plunger 48 to its open position. When the valve head 64 is open some of the increased fluid pressure transmitted to bore 46 creates an opposing force to close the valve head 64. Since the fluid pressure in bore 46 acts on a larger area ($B$) than the fluid pressure in bore 44 only a portion of the total increase in fluid pressure at bore 46 is required on bore 44 to close the valve head 64. This is the proportioning effect and it will respond to the following formulations:

$$\Delta P1 \frac{(B-A)}{(B)} = \Delta P2; \quad 1.$$

where $\Delta P1$ is the increase in pressure at bore 44 from the master cylinder 10; $\Delta P2$ is the increase in pressure at bore 46 resulting from the increase $\Delta P1$; and

2. $(P2) B = P1 (B-A) + F$ where $P2$ is the pressure in bore 46. The first equation defines the proportional relationship between the inlet and outlet pressures during proportioning action of the valve assembly 54; the second equation defines the absolute values of inlet and outlet pressure during proportioning.

As noted, it would be desirable to vary the magnitude of the pressure at which the proportioning begins in order to compensate for different vehicle load conditions. The desirability of this can be seen from the curves of FIG. 4. Curve A indicates the actual relationship between rear brake pressure and front brake (or master cylinder) pressure as would exist with no proportioning effect. Curves B–F indicate the idealized relationship between rear and front brake (or master cylinder) pressures at 0, ¼, ½, ¾ and full vehicle load respectively. Maximum braking effectiveness can be obtained by operating along the curves B–F. A typical curve for a proportioning valve is initiated at 500 psi and provides compensation for weight transfer most effectively at a vehicle load between one half and three quarters load. Operation along curve G, however, does not accommodate the other load conditions as well. Ad discussed, the force ($F$) of the spring 82 determined the pressure of initiation of the proportioning effect and in the present invention compensation for load variations is accomplished by varying the bias of the spring 82 in accordance with the deceleration of the vehicle and also in accordance with the magnitude of the brake pressure required to provide that deceleration.

Looking once more to FIG. 4, the curves B–F each have ten points each of which indicate a different deceleration rate (from 0.1g to 1g) attained by application of the corresponding brake pressure for a given $\mu$ surface. To approximate each of the curves B–F there is an optimum point along curve G at which proportioning should be initiated and this point can be determined by the relationship of the magnitude of rear brake pressure and of vehicle deceleration. For example, curve B initiation of proportioning should occur at approximately 0.2g and at rear brake pressure of around 220 psi. For full load on the other hand, it should occur at approximately 0.7g and at a rear brake pressure of around 835 psi. In the present invention then, the bias of spring 82 is varied in accordance with variations in magnitude in rear brake pressure occurring at different magnitudes of vehicle deceleration.

The spring 82 is located in a chamber 86 defined in a generally cylindrical housing 88. The housing 88 is located in the large cavity 26 and has an elongated nose portion 90 which slidingly engages the bore 40. A cap 92 closes the rearward end of the chamber 86 with a seal 94 sealing that end. The cap 92 is slidably supported in a counterbore 96 and has slots 97 to permit fluid to flow to the end thereof. Thus, the housing 88 is slidably supported for reciprocable motion via the cap 92 and counterbore 96 and via the nose portion 90 and bore 40.

In the housing 88 one end of the spring 82 engages the cap 92 while the other end engages the pin cap 84. The pin 80 is slidable supported in and extends outwardly through a through bore 98, extending through the nose portion 90, and engages the stem portion 52 of the plunger 48. In this manner the bias of the spring 82 is applied to the plunger 48 to normally hold the proportioning valve assembly 54 open. The valve assembly 54 functions to control the pressure to the rear brakes in accordance with the equations noted above and in the manner described.

An annular seal 99 seals the bore 40 and nose portion 90 from cavity 26 and therefore the pressure in cavity 26 will act on spring housing 88 to urge it to the left; as will be seen this functions to vary the bias of spring 82. As noted the bias ($F$) of spring 82 determines the magnitude of input pressure ($P1$) at which proportioning begins; this bias ($F$) will in turn be varied by the magnitude of input pressure from the master cylinder in the large cavity 26. The large cavity 26 is normally in communication with the input pressure ($P1$) in the small cavity 29 via a check valve assembly 100. The assembly 100 includes a valve member 102, which is slidably supported in a counterbore 104 in plate 34 via an enlarged head portion 106; the valve member 102 has a stem portion 108 which is extensible through a bore 110 in plate 34. The bore 110 and counterbore 104 define a passageway which communicates the cavities 26 and 29. The stem 108 is in clearance relationship with the bore 110 and has grooves 112 in the head portion 106 whereby fluid can flow past the valve member 102. As elastomeric, annular seal 114 is supported on the stem portion 108 and is operable when in engagement with the end wall 116 of counterbore 104 to block fluid flow through bore 110. A spring 118 normally urges the valve member 102 toward its closed position. A generally annular weight 120, located in large cavity 26, is engageable with the stem portion 108 as it extends into the cavity 26 to normally hold the valve member 102 in its open position. The weight 120 has a slot 122 at its lower end which slot 122 receives a projection 124 which extends rearwardly from the bottom of the plate 34. A pin 126 extends through the slot 122 and projection 124 and connects the weight 120 for pivotal movement. The opposite ends of the pin 126 are supported in bushing 128 (see FIG. 2) while a set screw 130 located in projection 124 engages a necked down portion 132 of the pin 126 to hold it in place.

The weight 120 is normally held in its rearward position against the stem portion 108 by the bias of a spring 132 which is located between a shoulder 136 on weight 120 and the spring housing cap 92. The bias of spring 118 on valve member 102, while sufficient to hold the member 102 against the weight 120 is not sufficient to pivot the weight away to permit the valve assembly 100 to close. Note that the spring 132 also serves to normally maintain the spring housing 88 in its rearward position.

In operation when the vehicle operator actuates the brake pedal 12 the cavity 29 will be pressurized as will the large cavity 26. This pressure will act on the differential area provided by the spring housing 88 and when the relatively bias of spring 132 has been overcome the housing 88 will move to the left to further compress the spring 82 increasing the bias ($F$) applied to the plunger 48. This will result in increasing the input pressure $P1$ at which proportioning will be initiated, The valve 22 is mounted to a vehicle such that the axis X of the weight 120 is along or parallel to the longitudinal axis of the vehicle and with the cap 28 facing forwardly. The weight 120 is selected to be of a mass such that at a preselected maagnitude of vehicle deceleration the weight 120 will pivot forwardly against the bias of the spring 132 permitting the valve member 102 to close. The magnitude of pressure $P1$ at which this occurs is stored in the cavity 26 and will result in a modification of the bias $F$ on plunger 48 as provided by spring 82. This now sets the magnitude of pressure $P1$ in cavity 29 at which valve assembly 54 will initiate its proportioning function. If the load of the vehicle is changed then the magnitude of brake pressure required to provide the necessary magnitude of deceleration to pivot the weight 120 will change, this will result in a different bias ($F$) from spring 82 and compensation for the change in vehicle load. From FIG. 4, it can be seen that if the weight 120 were actuated to permit valve 102 to close at the same magnitude of vehicle deceleration some performance benefits would be gained; however, optimum benefits will occur when the magnitude of deceleration at which the weight 120 is actuated is varied, for example from 0.2g at 220 psi to 0.7g at 835 psi. This is accomplished by the spring 132 the bias of which varies with the pressure in the cavity 26 via the movement of the spring housing 88. Thus while at 220 psi a 0.2g deceleration will be attained for no load at full load a 0.2g deceleration will be attained at 390 psi. The spring 132 is selected such that at 220 psi in cavity 26 the weight 120 will be actuated at 0.2g; however, at 390 psi, the increased bias via spring 132 will hold weight 120 deactuated at 0.2g. In this regard then it can be seen that the proportioning valve 24 functions to increase the magnitude of the pressure to the rear brakes 20 as the magnitude of brake pressure required to provide a selected magnitude of vehicle deceleration increases. This, of course, provides sensitivity to and compensation for variations in vehicle loading.

In order to compensate for grade the center of gravity of weight 120 is located in vertical alignment with the pivot axis of pin 126. When the vehicle is going upgrade a greater deceleration is required to pivot weight 120 so that valve 102 closes at a higher hydraulic pressure and proportionately higher hydraulic pressure is permitted to the rear brakes than when the vehicle is going down grade, which is desirable.

There is a time lag between the application of brake pressure and the resultant braking effect on the vehicle. This becomes a noticeable factor under panic stop conditions when full brake pressure is quickly generated in the brake system. To compensate for this, the flow path around valve member 102 is restricted such that it will be responsive to flow velocity; this will result in a delay in the build up of pressure in cavity 26 and also will result in a pressure force on the valve 102 tending to close it; this force in turn will act on weight 120 whereby it will pivot or actuate at a lesser magnitude of deceleration; both factors tend to compensate for the effects of rapid brake application.

In the prior description, the proportioning valve 22 is shown to be operative with the system for the rear brakes 20; in this case the valve 22 generally functions to reduce the magnitude of the pressure to the rear brakes 20 relative to that applied to the front brakes 16. However, it should be understood that features of this invention could be applied to a system in which a proportioning valve was located in the front brake system to provide for an increase in front brake pressure relative to rear brake pressure to compensate for weight transfer during braking.

Also, while it will be apparent that the preferred embodiment of the invention disclosed are well calculated to fulfill the objects above stated, it will be appreciated

What is claimed is:

1. In an automotive vehicle having front and rear wheel brake system, apparatus comprising: proportioning valve means in one of the systems actuable for modulating the brake pressure in that one of the systems to provide for a reduced brake effect at the rear wheels relative to that at the front wheels to compensate for weight transfer during braking, said proportioning valve means comprising a movable valve member and a valve seat member operatively connected in said one of the systems to modulate the brake pressure therein upon attainment of a first determinable magnitude of brake pressure, and bias means for maintaining said valve member and said valve seat member deactuated until attainment of said first determinable magnitude, a fluid chamber, a piston in said chamber and operatively connected to said movable valve member for varying the magnitude of said first determinable magnitude in accordance with variations in the magnitude of fluid pressure in said chamber, a member supported for movement in response to the deceleration of the vehicle, valve means normally fluid communicating said chamber with said at least part of said brake systems whereby the magnitude of fluid pressure in said chamber is determined by that pressure of said at least part of said brake systems, said member operatively connected with said valve means with said valve means closing said chamber from fluid communicating with said at least part of said brake systems in response to movement of said member in response to deceleration of the vehicle attaining a second determinable magnitude whereby the modulating effect of said porportioning valve means compensates for variations in loading of the vehicle.

2. The apparatus of claim 1 comprising means connected to said member for varying the magnitude of said second determinable magnitude in accordance with variations in the magnitude of fluid pressure in said one of the systems.

3. The apparatus of claim 1 with said member mounted in said chamber, bias means connecting said piston with said member whereby the magnitude of said second determinable magnitude will be varied in accordance with variations in the magnitude of the fluid pressure in said chamber.

4. In an automotive vehicle having front and rear wheel brake systems the improvement comprising:

proportioning valve means in one of the systems actuable in response to attainment of a brake pressure of a determinable magnitude in said systems to initiate modulation of the brake pressure in that one of the systems to provide for a reduced brake effect at the rear wheels relative to that at the front wheels to compensate for weight transfer during braking, said proportioning valve means comprising a movable valve member and a valve seat member operatively connected in said one of the systems to modulate the brake pressure therein upon attainment of a first determinable magnitude of brake pressure, and bias means for maintaining said valve member and said valve seat member deactuated until attainment of said first determinable magnitude, means for controlling operation of said movable valve member for varying the magnitude of said first determinable magnitude, a pivotally supported member responsive to the deceleration of the vehicle, a fluid chamber, valve means communicable with said part of said brake system, said pivotally supported member operatively connected with said valve means such that said part of said brake system is selectively communicated with said chamber in response to movement of said member in response to deceleration of the vehicle, whereby the modulating effect of said proportioning valve means compensates for variations in loading of the vehicle.

5. The improvement of claim 4 with said proportioning valve means comprising spindle means movable for modulating the brake pressure in that one of the systems and with the modulation being a function of the movement of said spindle means, said deceleration means operatively connected with said spindle means for varying the initiation of said movement of said spindle means in accordance with variations in the magnitude of the deceleration of the vehicle.

6. The improvement of claim 5 with said deceleration means further comprising fluid pressure means for varying initiation of said movement as a function of the magnitude of the deceleration of the vehicle and of the magnitude of the brake pressure in said systems.

7. In an automotive vehicle having front and rear brake systems operated by fluid pressure, the improvement comprising: brake pressure proportioning means for modulating the brake pressure to provide a relatively lower pressure in the rear brakes and a relatively higher pressure in the front brakes to compensate for weight transfer during braking, said proportioning means comprising a proportioning valve having an open condition and a closed condition, spring means for keeping said proportioning valve open with a preselected bias, fluid pressure operated means responsive to said fluid pressure to increase the bias of said spring means to increase the resistance to actuation of said closed condition of said proportioning valve, control valve means actuable to a closed position for interrupting communication of said fluid pressure to said fluid pressure operated means to prevent further increasing of said bias of said spring means, vehicle deceleration sensing means for actuating said control valve means to said closed position in response to vehicle deceleration, and means responsive to the increase in bias of said spring means to resist actuation of said control valve means to said closed position until a higher vehicle deceleration is attained.

8. In an automotive vehicle having front and rear wheel brake systems, the improvement comprising:

proportioning valve means in one of the systems actuable for modulating the brake pressure in that one system to provide for a reduced brake effect at the rear wheels relative to that at the front wheels to compensate for weight transfer during braking, first means for detecting the magnitude of deceleration of the vehicle, said first means including a member supported for movement in response to the deceleration of the vehicle and effective relative to the actuation of said proportioning valve means for magnitudes of deceleration below a determinable magnitude, second means for detecting the magnitude of the brake pressure in at least a part of said brake systems which results in said magnitude of deceleration, said second means including bias means for varying said determinable magnitude in accordance with variations in the magnitude of brake pressure in at least a portion of said brake system, said bias means comprising a piston in a chamber operatively connected with said member, valve means normally fluidly communicating said chamber with said at least part of said brake systems whereby said piston will be acted on by the fluid pressure in said chamber for varying said determinable magnitude, and actuating means operatively connected with said first and second means for varying the actuation of said proportioning valve means as a function of said magnitude of deceleration and the corresponding said magnitude of the brake pressure whereby the modulating effect of said proportioning valve means compensates for variations in loading of the vehicle.

9. The apparatus of claim 8 with said actuating means comprising said piston operatively connected with said proportioning valve means for varying the actuation of said proportioning valve means in accordance with said magnitude of the brake pressure.

10. The apparatus of claim 9 with said member operatively connected with said valve means with said valve means closing said chamber from fluid communicating with said at least part of said brake systems in response to movement of said chamber.

11. The apparatus of claim 10 with said member being a weight secured for pivotal movement about an axis transverse to the longitudinal axis of the vehicle with the center of gravity of said weight being in vertical alignment with said transverse axis.

12. The apparatus of claim 10 with said valve means comprising a valve member actuable on said member and being responsive to the rate of increase in pressure in said at least part of said brake systems for applying a force on said member whereby said member will move to a position with said valve means closing at a lower magnitude of said determinable magnitude such as to provide compensation for rapid brake application as would occur in a panic stop situation.

13. In an automotive vehicle having front and rear wheel brake systems, the improvement comprising:

proportioning valve means in one of the systems actuable for modulating the brake pressure in that one of the systems to provide for a reduced brake effect at the rear wheels relative to that at the front wheels to compensate for weight transfer during braking, said proportioning valve means including a valve member movable along a longitudinal axis toward and away from an associated valve seat, first means for detecting the magnitude of deceleration of the vehicle, and second means for detecting the magnitude of the brake pressure in at least a part of said brake systems which results in said magnitude of deceleration, and actuating means operatively connected with said first and second means for varying the actuation of said proportioning valve means as a function of said magnitude of deceleration and the corresponding said magnitude of the brake pressure whereby the modulating effect of said proportioning valve means compensates for variations in loading of the vehicle, said first means comprising a movable weight secured for pivotal movement about an axis transverse to both the longitudinal axis of the vehicle and the longitudinal axis of movement of said valve member with the center of gravity of said weight being in vertical alignment with said transverse axis.

14. The apparatus of claim 13 with said first means comprising a weight supported for movement in response to the deceleration of the vehicle and effective relative to the actuation of said proportioning valve means for magnitudes of deceleration below a determinable magnitude and bias means for maintaining said weight effective for magnitudes of deceleration below said determinable magnitude.

* * * * *